No. 779,334. Patented January 3, 1905.

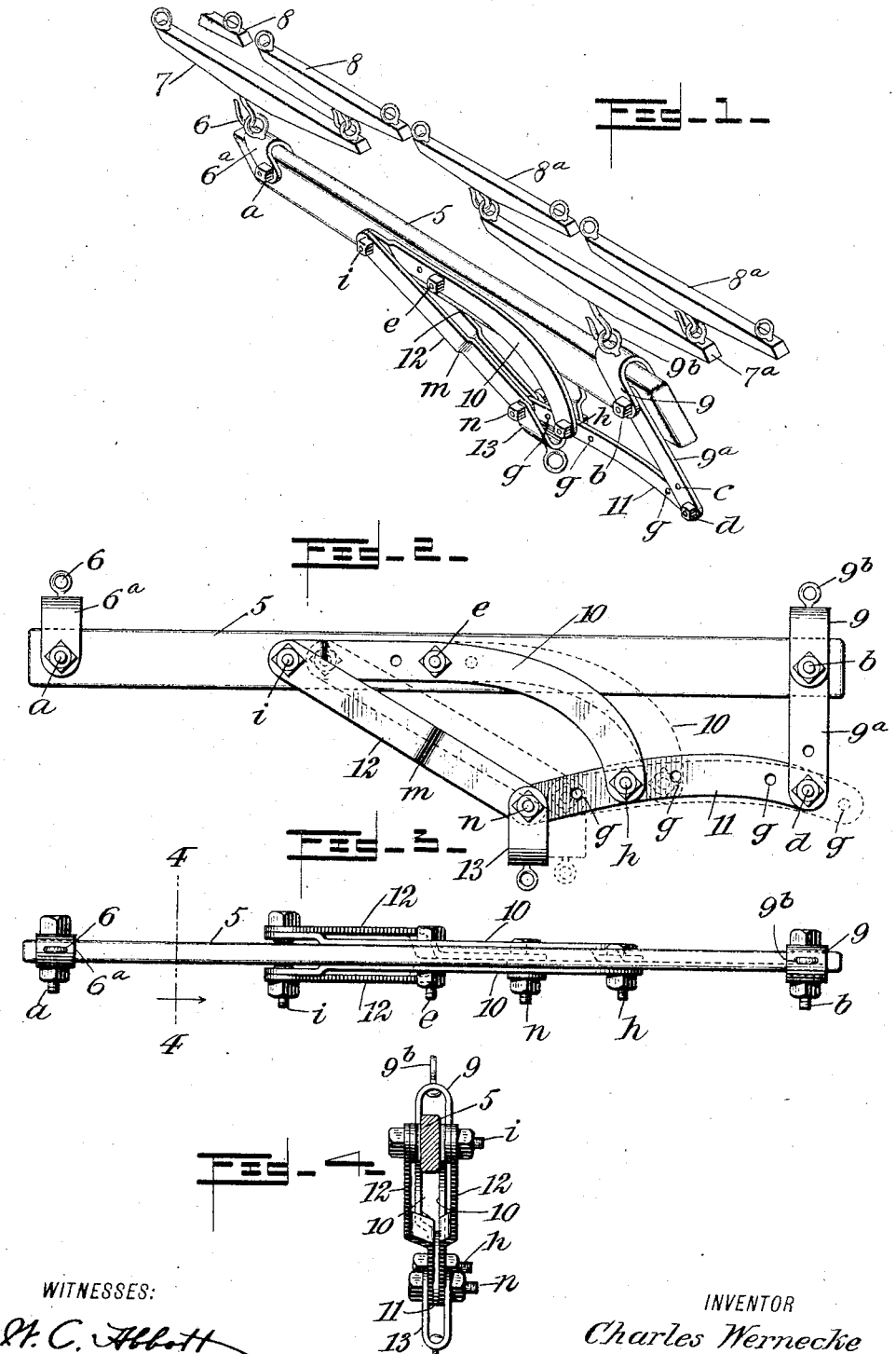

UNITED STATES PATENT OFFICE.

CHARLES WERNECKE, OF GENESEE, IDAHO.

DRAFT-EQUALIZER.

SPECIFICATION forming part of Letters Patent No. 779,334, dated January 3, 1905.

Application filed May 28, 1904. Serial No. 210,145.

*To all whom it may concern:*

Be it known that I, CHARLES WERNECKE, a citizen of the United States, and a resident of Genesee, in the county of Latah and State of Idaho, have invented a new and Improved Draft-Equalizer, of which the following is a full, clear, and exact description.

The object of my invention is to provide a novel simple draft-equalizer which is adjustable in its parts, whereby four draft-animals will be permitted to work abreast—one animal in the furrow and the other draft-animals on the firm soil at the land side of the plow.

Furthermore, it is an object of the invention to provide novel simple details of construction for a draft-equalizer which permit the use of three or five draft-animals working abreast, keep the animals spaced apart, and prevent side pull on the plow or draft device.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a perspective view of the improved draft-equalizer. Fig. 2 is a plan view of the same. Fig. 3 is a front view, and Fig. 4 is a transverse sectional view, substantially on the line 4 4 in Fig. 3.

The main draft-bar 5 is preferably in the form of a flat bar having proper width, thickness, and length for effective service and may be constructed of hard tough wood. Upon the left-hand end of the draft-bar 5 a ring-eye 6 is held loosely by a clip $6^a$, that is adapted to embrace the end portion of the draft-bar and is thereon secured by a bolt $a$, this ring-eye being provided for the connection of a doubletree 7 and swingletrees 8 with the bar 5 or a swingletree in case this is preferred, as will hereinafter be explained. Upon the other end of the draft-bar 5 a U-shaped clip 9 is mounted and secured by a bolt $b$. A link $9^a$, that at its forward end is pivoted upon the clip and draft-bar by said bolt $b$, extends rearward and in the extended end has perforations $c$, that receive a bolt $d$. A ring-eye $9^b$ is extended from the looped forward end of the clip 9 for the loose connection therewith of a doubletree $7^a$ and swingletrees $8^a$. At the longitudinal center of the draft-bar 5 a perforation is formed for the reception of a pivot-bolt $e$.

Two similar link-plates 10, that are curved edgewise near one end of each, are oppositely perforated near their other ends and in said perforations receive the pivot-bolt $e$, these arcuate link-plates being disposed in contact with the flat sides of the draft-bar 5, so that their curved ends project a suitable distance from the normally rear edge of the draft-bar.

A flat secondary draft-bar 11 is provided that may be curved edgewise, and in said draft-bar a plurality of perforations $g$ are formed, one being near each end thereof. The secondary draft-bar 11 is lapped at one end upon an end of the link $9^a$ that extends from the clip 9 and is loosely secured thereto by the bolt $d$. The remaining end of the secondary draft-bar 11 projects toward and beyond the curved ends of the spaced link-plates 10, passing between them, and it will be noticed that the concave edge of the draft-bar 11 is disposed rearwardly.

The lapped ends of the arcuate link-plates 10 are perforated, so as to register with an appropriate perforation $g$ in the secondary draft-bar, wherein a securing-bolt $h$ is inserted and held by a nut or other means.

Two straight-edged link-bars 12 are lapped at like ends upon adjacent ends of the arcuate link-plates 10 and are thereto pivoted oppositely by the two similar bolts $i$, thus disposing these pivoted ends of the members 10 and 12, respectively, above and below the draft-bar 5, as is clearly shown in Fig. 3. The straight-edged link-bars 12 at a suitable distance from their ends that lap upon and are pivoted to the ends of the arcuate link-plates 10 are offsetted laterally, as shown at $m$, thus disposing the remaining portions of the link-bars 12 adjacent to each other. The length of the pair of straight-edged link-bars 12 and that of the secondary draft-bar 11 may be nearly equal one with the other, and the link-bars at their adjacent ends are lapped oppositely upon the end portion of the secondary draft-bar which is projected toward them from the arcuate link-plates 10.

Upon the lapping ends of the link bars 12 a U-shaped clevis 13 is mounted and pivoted, the pivot-bolt $n$ passing through alined perforations in the clevis, link-bars, and secondary draft-bar, as is indicated in Fig. 4.

It will be seen that from the relative lengths of the offset link-bars 12 and the secondary draft-bar 11 the clevis 13 is disposed at a predetermined distance from the center draft-bolt $e$, and, furthermore, that this distance may be altered by shifting the secondary draft-bar endwise, which may be effected by changing the bolts $h$ and $n$, that may pass through other perforations $g$ in the secondary draft-bar, this altered adjustment for said parts being indicated by dotted lines in Fig. 2.

It will be evident that if the beam of a plow that is to be drawn by a four-horse team is connected to the clevis 13 and the two pairs of draft-animals are hitched to the singletrees 8 $8^a$ the pair of horses at the right side of the plow-beam and clevis 13 will, if the plow is adapted to turn a furrow to the right, be permitted to walk one in the furrow turned by the plow and the other one of said pair of animals travel on the firm soil near the furrow, the other pair of animals working on the unplowed soil at the left side of the plow-beam.

In case the draft-equalizer is employed for hitching five horses to a plow, such as a gang-plow, three horses are to be coupled upon the end of the draft-bar that is farthest from the clevis 13 and two horses on the other end of the same which is at the right side of the clevis, the horse at the extreme right walking in the furrow and the adjacent horse on firm soil.

In case it is desired the distance between the clip 9 and the clevis 13 may be reduced or increased by shifting the bolts $d$ and $h$ into other holes $g$, thus changing the positions of the parts 10 and 12.

It will be noted that as the improved draft-equalizer is adapted to be reversed in position endwise the secondary draft-bar 11 may be disposed at the left of the central draft-bolt $e$, so that in case the plow is adapted to turn a furrow toward the right then the team at the right-hand end of the main draft-bar 5 will travel in the furrow and near it and the pair of horses hitched to the left-hand end of said main draft-bar will work on the firm ground, the longer end portion of the bar between the clevis 13 and clip $6^a$, that now extends to the right, affording leverage to equalize draft strain, as before explained.

In case the equalizer is employed for hitching five horses to a plow, such as a gang-plow, four horses may be attached abreast upon the end of the main draft-bar 5 which is nearest to the clevis 13 and the single horse be hitched by a swingletree upon the other end of said draft-bar 5, and in case it is necessary the leverage given to the single draft-animal may be increased by shifting the bolt connections, as before mentioned, so as as to reduce the distance between the clip 9 and the clevis 13 and correspondingly increase the distance between said clevis and the clip $6^a$. It is also in a like manner feasible to hitch three draft-animals to the main draft-bar 5 by coupling a single animal to the longer end of said bar that is between a swingletree and the clevis 13 and two horses side by side to the shorter end of the main draft-bar, as before explained.

If it is desired to use the draft-equalizer for pulling a harrow or a wheeled wagon where there is not a necessity for throwing draft strain at one side of the center of the main draft-bar, the secondary draft-bar 11 and the link-bars 12 may be removed from the main draft-bar in an obvious manner and the clevis 13 be secured upon the main draft-bar by the central draft-bolt $e$, so that the load may be coupled to the center of the main draft-bar 5 by its attachment to the clevis.

Having thus described my invention, I claim as new and desire to secure by Letters Patent—

1. A draft-equalizer embodying a main draft-bar, a clip on each end of said draft-bar for connection of draft-animals thereto, a secondary draft-bar, a link forming a rear extension from one clip and loosely connected at one end thereto, means for connecting the opposite end of the secondary draft-bar to the main draft-bar, and a clevis loosely secured on the secondary draft-bar at one side the center of the main draft-bar.

2. A draft-equalizer, embodying a main draft-bar, a clip on each end of said draft-bar for connection of draft-animals thereto, a link pivoted by one end on one clip and rearwardly extended therefrom, a secondary draft-bar pivoted by its outer end upon the remaining end of the link, an arcuate link-plate loosely and changeably secured by one end upon the secondary draft-bar between the ends of said bar, a link-bar pivoted at one end upon an end of the secondary draft-bar and extended diagonally toward the remaining end of the arcuate link-plate whereon it is pivoted, and a clevis pivoted upon the lapped ends of the secondary draft-bar and link-bar.

3. A draft-equalizer embodying a main draft-bar having flat sides, a clip on each end of said bar for connection of draft-animals thereto, a link pivoted at one end upon one clip and extended rearward, a secondary draft-bar changeably secured near one end to said link, two arcuate link-plates changeably pivoted between their ends upon the main draft-bar near its center, two link-bars offsetted between their ends and lapped upon the ends of the arcuate link-plates whereon they are pivoted, the remaining ends of said offsetted link-bars lapping upon an end of the secondary draft-bar, a clevis clasping the ends of
5 the link-bars upon the secondary draft-bar, and a changeable bolt passing through the link-bars and the intervening secondary draft-bar.

In testimony whereof I have signed my name to this specification in the presence of two subscribing witnesses.

CHARLES WERNECKE.

Witnesses:
 HANS BUGGE,
 JOSEPH F. HASFURTHER.